(12) United States Patent
Koyama et al.

(10) Patent No.: US 7,865,353 B2
(45) Date of Patent: Jan. 4, 2011

(54) TRANSLATION DEVICE, IMAGE PROCESSING DEVICE, TRANSLATION METHOD, AND RECORDING MEDIUM

(75) Inventors: Toshiya Koyama, Ashigarakami-gun (JP); Teruka Saito, Ashigarakami-gun (JP); Masakazu Tateno, Ashigarakami-gun (JP); Kei Tanaka, Ashigarakami-gun (JP); Takashi Nagao, Ashigarakami-gun (JP); Masayoshi Sakakibara, Ebina (JP); Xinyu Peng, Ebina (JP); Kotaro Nakamura, Minato-ku (JP); Atsushi Itoh, Ashigarakami-gun (JP); Masatoshi Tagawa, Ebina (JP); Michihiro Tamune, Ashigarakami-gun (JP); Hiroshi Masuichi, Ashigarakami-gun (JP); Naoko Sato, Ebina (JP); Kiyoshi Tashiro, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1095 days.

(21) Appl. No.: 11/196,240

(22) Filed: Aug. 4, 2005

(65) Prior Publication Data
US 2006/0217954 A1 Sep. 28, 2006

(30) Foreign Application Priority Data

Mar. 22, 2005 (JP) ............................. 2005-082047
Mar. 25, 2005 (JP) ............................. 2005-090179

(51) Int. Cl.
*G06F 17/28* (2006.01)
*G06K 9/72* (2006.01)
*G06K 9/54* (2006.01)

(52) U.S. Cl. ...................... 704/3; 704/2; 704/4; 704/5; 382/229; 382/305

(58) Field of Classification Search .................. 704/2–8; 382/173, 176, 229, 698, 305
See application file for complete search history.

(56) References Cited

U.S. PATENT DOCUMENTS

| 5,765,176 | A  | * | 6/1998 | Bloomberg | 715/209 |
| 5,893,127 | A  | * | 4/1999 | Tyan et al. | 715/209 |
| 5,907,631 | A  | * | 5/1999 | Saitoh | 382/176 |
| 6,377,704 | B1 | * | 4/2002 | Cooperman | 382/176 |
| 7,120,868 | B2 | * | 10/2006 | Salesin et al. | 715/249 |
| 2002/0064316 | A1 | * | 5/2002 | Takaoka | 382/305 |
| 2002/0101614 | A1 | * | 8/2002 | Imes | 358/1.18 |
| 2004/0194028 | A1 | * | 9/2004 | O'Brien | 715/517 |
| 2004/0205568 | A1 | * | 10/2004 | Breuel et al. | 715/513 |

FOREIGN PATENT DOCUMENTS

JP  A 60-020283  2/1985

(Continued)

*Primary Examiner*—James S Wozniak
*Assistant Examiner*—Jialong He
(74) *Attorney, Agent, or Firm*—Oliff & Berridge, PLC

(57) ABSTRACT

A translation device comprises a character recognition unit that recognizes text data in a text region of an input image; a translator that translates the text data in the text region; and a layout configuration processor that generates data containing the translated text data in the text region and graphics in the input image, wherein a layout of the input image is maintained in a layout of the image of the data generated by the layout configuration processor.

10 Claims, 6 Drawing Sheets

FOREIGN PATENT DOCUMENTS

| | | |
|---|---|---|
| JP | A-61-229161 | 10/1986 |
| JP | A 04-107679 | 4/1992 |
| JP | A 05-054073 | 3/1993 |
| JP | 05-108716 * | 4/1993 |
| JP | A 6-162081 | 6/1994 |
| JP | A-07-074934 | 3/1995 |
| JP | A 7-85215 | 3/1995 |
| JP | A 07-121539 | 5/1995 |
| JP | A 7-121539 | 5/1995 |
| JP | A 8-6948 | 1/1996 |
| JP | A 09-114835 | 5/1997 |
| JP | A 9-114835 | 5/1997 |
| JP | A-10-105548 | 4/1998 |
| JP | A 2003-122751 | 4/2003 |
| JP | A 2005-011261 | 1/2005 |

* cited by examiner

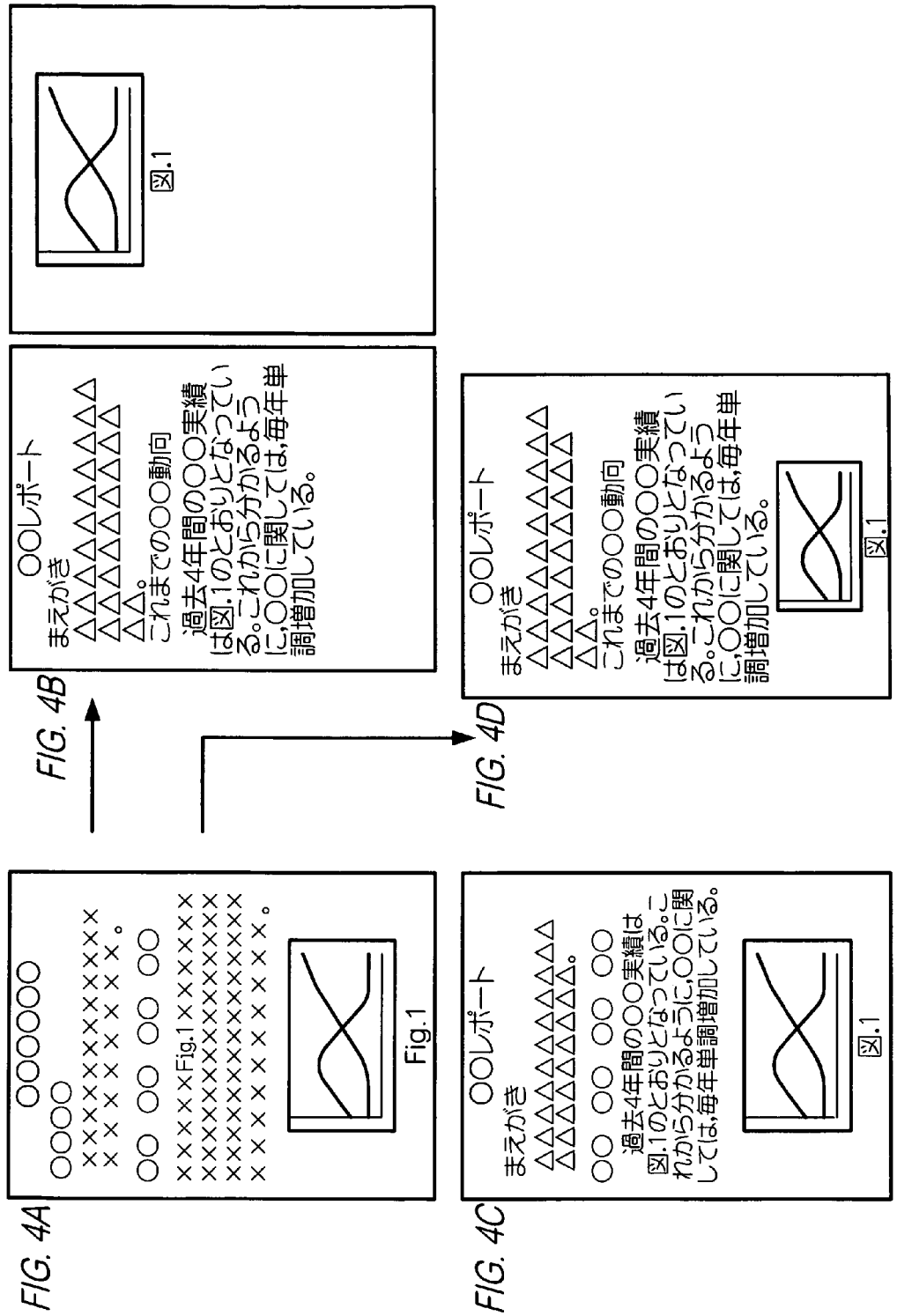

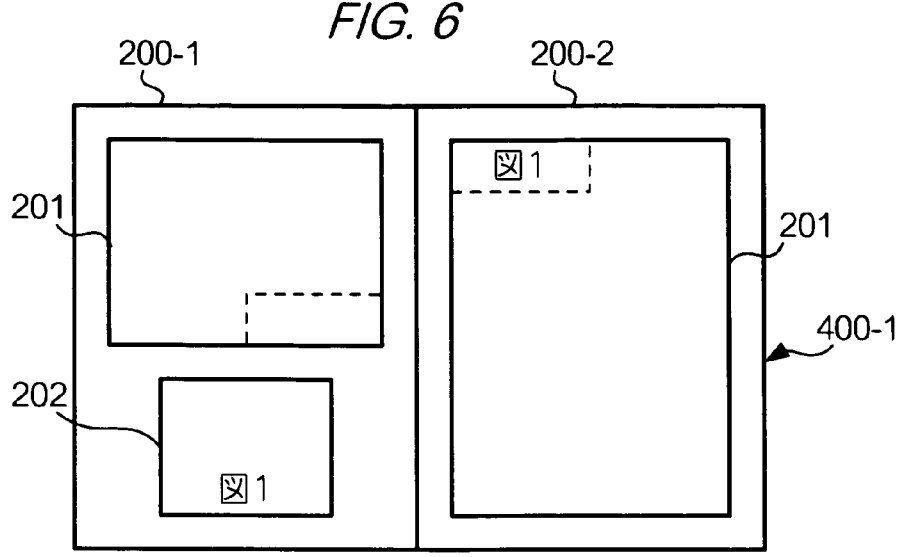
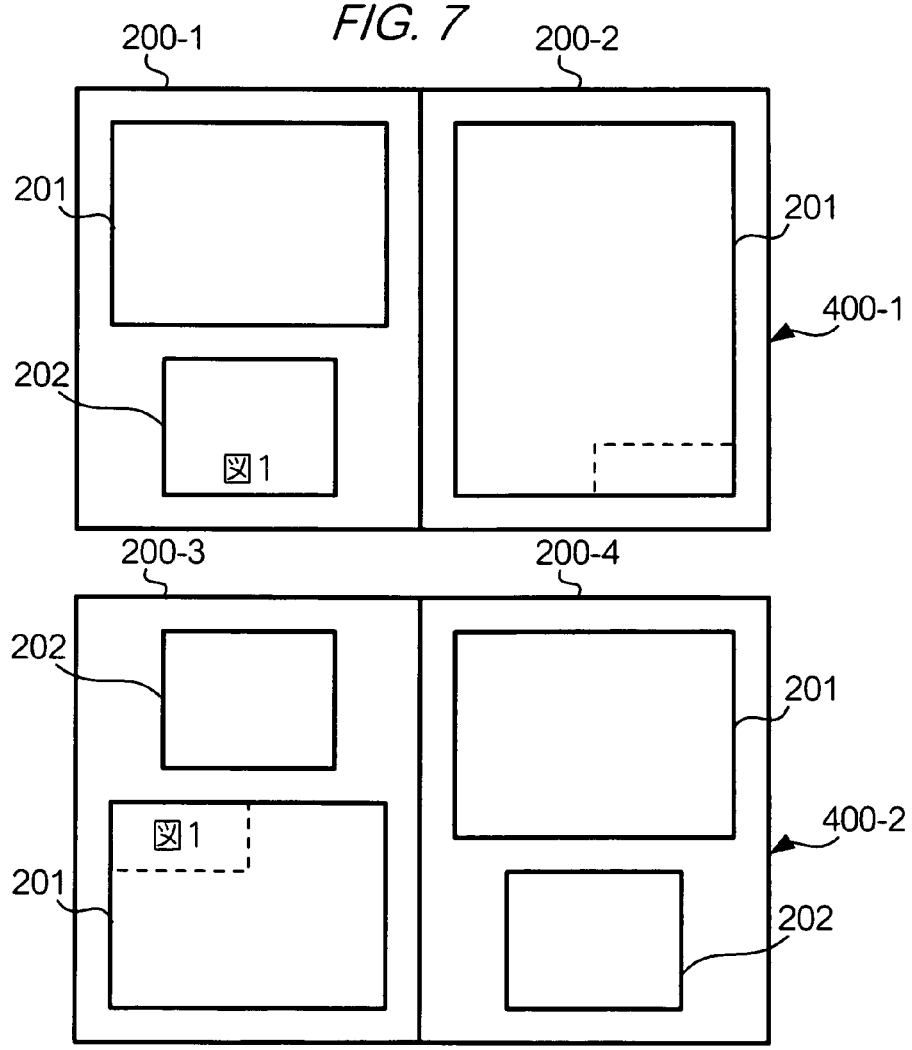

FIG. 8
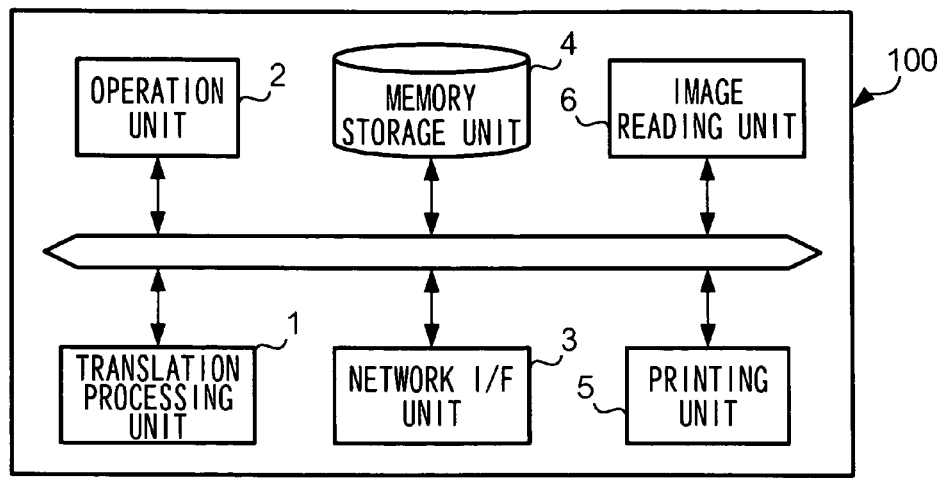
FIG. 9
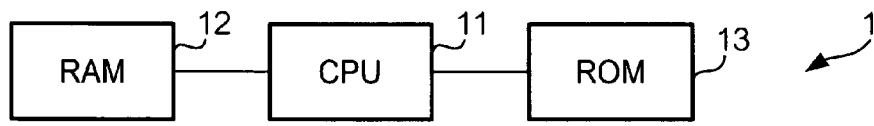
FIG. 12A
このレポートで、日本における現在の経済動向を探求したい
In this paper, I would like to explore the current economic trend in Japan.
FIG. 12B
このレポートで、日本における現在の経済動向を探求したい
In this paper, I would like to explore the current economic trend in Japan.

TRANSLATION DEVICE, IMAGE PROCESSING DEVICE, TRANSLATION METHOD, AND RECORDING MEDIUM

BACKGROUND OF THE INVENTION

1. Field of the Invention

This relates to a technique for generating translation data after text contained in a document is translated from one language into another language.

2. Description of the Related Art

Various types of translation devices have been proposed, which receive image data of a document with or without graphics, translate text contained in a text region of the image data, and generate a translated document containing the translated text, or a document containing the translated text and the original graphics.

It is known to provide a technique that a text region and a graphic region of input data are separated using layout analysis, and characters in the text region are recognized for translation. The volume of resulting translated text is then compared to a size of an existing text region, so that the text region can be re-formed according to a result of the comparison. However, a graphic region is allocated on a next page if, as a result of the re-formation of the text region, the graphic region can no longer be allocated in the same page. Thus, due to changes in an allocation of a text region and a graphic region, a reader may have difficulty reading the translated document.

Further, since translation devices commonly used output an original document and a translated document in separate regions of the same page or in separate pages, it is often difficult for a reader to find correspondences between the original and the translated text. It is known to provide a technique of arranging a translated text between lines of the original text, thereby to reduce troubles caused to a user in finding correspondences between the original and the translated text.

However, a translated text contains a number and type of characters that are different from those in an original text; and as a result, a length of character strings of which a line of translated text consists does not match a length occupied by a line of the original text.

SUMMARY OF THE INVENTION

The present invention has been made in view of the above circumstances and provides a system for retaining an original layout of a text region and a graphic region, so as to generate translation data containing a translated text portion and an original graphic portion. Further, the present invention provides a system for enabling generation of translation data, by use of which a user can easily associate an original document with a translated document, with enhanced viewability.

In one aspect, the present invention provides a translation device comprising: a character recognition unit that recognizes text data in a text region of an input image; a translator that translates the text data in the text region; and a layout configuration processor that generates data containing the translated text data in the text region and graphics in the input image, wherein a layout of the input image is maintained in a layout of the image of the data generated by the layout configuration processor.

According to an embodiment of the present invention, data of translated text with graphics, with its text portion being translated, can be generated while maintaining a layout of a text region and a graphics region of input data.

In another aspect, the present invention provides a translation device comprising: a translation processor that translates an original text and performs corrections for causing a length of a character string of the original text and a character string of the translated text to be substantially identical to each other, wherein the original text and the translated text are located in parallel.

According to an embodiment of the present invention, since a character string of a translated text is made identical in its length and is positioned in parallel to that of an original text, a user can readily make correspondences between the original text and the translated text. As a result, viewability is greatly enhanced.

BRIEF DESCRIPTION OF THE DRAWINGS

Embodiments of the present invention will be described in detail based on the following figure, wherein:

FIGS. 4A to 4D are diagrams for describing effects of the first embodiment in comparison with a conventional technique;

FIG. 6 is a diagram for describing a process according to another embodiment;

FIG. 7 is a diagram for describing a process according to another embodiment;

FIG. 8 is a block diagram showing an image generation device according to a third embodiment of the present invention;

FIG. 9 is a block diagram showing a configuration of a translation processing unit of an image generation device according to the third embodiment;

FIGS. 12A and 12B are diagrams showing character strings, describing a process of correcting a length of character strings, the process being performed in the translation processing unit.

DETAILED DESCRIPTION OF THE INVENTION

In the following, embodiments of the invention will be described with reference to the drawings.

First Embodiment

Figure 1:
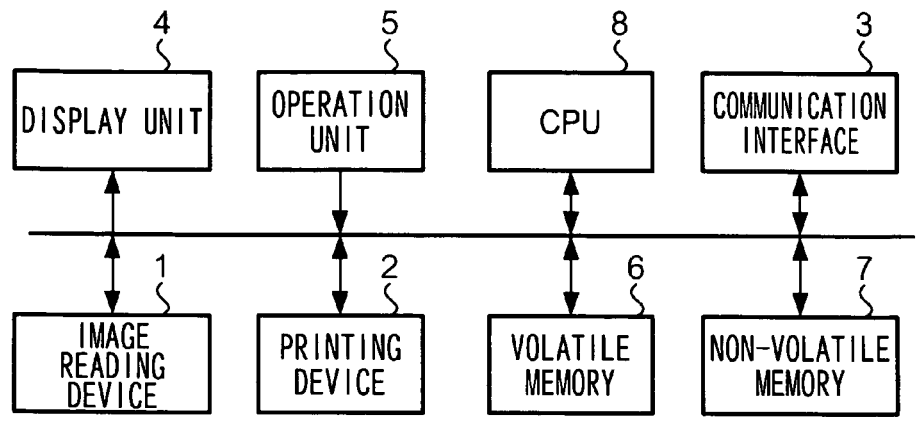
FIG. 1 is a block diagram showing a configuration of a translation device according to a first embodiment of the present invention.

FIG. 1 is a block diagram showing a basic configuration of a translation device according to a first embodiment of the present invention. The translation device has a configuration similar to that of a multi-functional machine having a combination of a scanning function, a copying function, a printing function, and a facsimile function. The translation device has an image reading device 1 with an ADF (Automatic Document Feeder), a printing device 2, a communication interface 3, a display unit 4, an operation unit 5, a volatile memory 6, a non-volatile memory 7, and a CPU 8 controlling each of the above units. Multiple functions are realized, under control of CPU 8, at the translation device in such ways to realize a copying function of printing via printing device 2 an image read by image reading device 1, a facsimile function of transmitting the image to a correspondent facsimile device through communication interface 3 and a network, and the like.

There is stored in non-volatile memory 7 a program particular to the present embodiment, in addition to control programs for causing CPU 8 to execute controls for realizing multiple functions provided with this type of multi-functional device, the particular program being a document-with-graphics translation program which translates text contained in an image scanned from outside the device into another language, and which generates translation data with graphics for output, the translation data containing translated text data in place of an image representing original text. A typical procedure performed by the document-with-graphics translation program is shown in a flowchart of FIG. 2. To avoid repeated description, the details of the procedure will be described in a later part of the present embodiment where description of an operation of the present embodiment is provided.

The translation technique according to the present embodiment has a configuration such that the document-with-graphics translation program can be utilized in such ways as follows:

a. to read, in image reading device 1, an image of a document containing text written in one language with graphics and to store the image in volatile memory 6, so that the image is processed using the document-with-graphics translation program and data of translated text with graphics obtained through the process is output as an image using printing device 2. Alternatively, communication interface 3 is used to transmit, via facsimile or via email, the data of translated text with graphics obtained through the process to a user who needs the translated data; and b. to receive, via communication interface 3, an image of a document containing text written in one language with graphics and to store the image in volatile memory 6, so that the image is processed using the document-with-graphics translation program and data of translated text with graphics obtained through the process is output as an image using printing device 2. Alternatively, communication interface 3 is used to transmit, via facsimile or via email, the data of translated text with graphics obtained through the process to a user who needs the translated data.

There is stored in non-volatile memory 7 a control program for enabling transmission of an image, which is input information of the document-with-graphics translation program, and data of translated text with graphics, which is output information of the program. Detailed instructions for causing the control program to perform the information transmission are provided through a command provided via operation unit 5 or communication interface 3.

Figure 2:
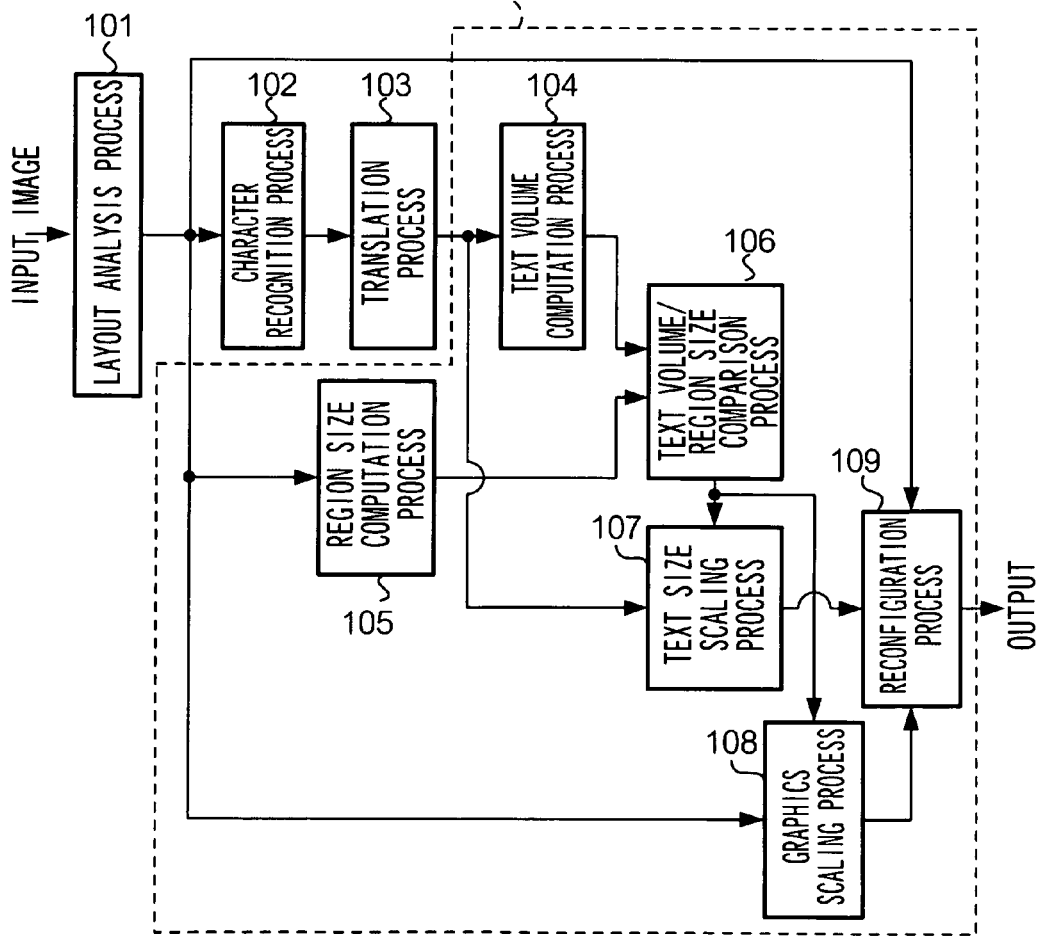
FIG. 2 is a flowchart showing a procedure of a document-with-graphics translation program according to the first embodiment.
Figure 3:
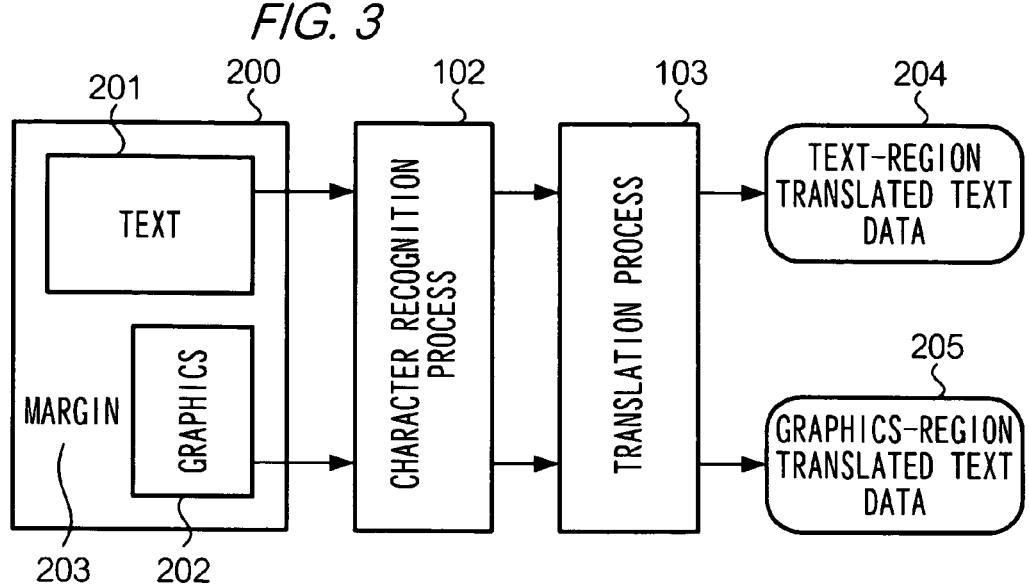
FIG. 3 is a diagram showing a part of a procedure of a document-with-graphics translation program according to the first embodiment.

In the following, description will be given of an operation of the present embodiment. Once an image of one or plural pages to be processed is input through image reading device 1 and communication interface 3 and then stored in volatile memory 6, CPU 8 executes the document-with-graphics translation program whose flow of procedure is shown in FIG. 2. In a layout analysis process 101, which is a first process of the document-with-graphics translation program, CPU 8 analyzes layout of the input image stored in volatile memory 6. CPU 8 then obtains a text region 201, a graphics region 202, and a margin region 203, such as shown in FIG. 3, and stores in a work area of volatile memory 6 data of translated text with graphics having the same regions as the obtained regions. At this stage, text region 201 and graphics region 202 are empty.

CPU 8 then sequentially executes a character recognition process 102, a translation process 103, and a text volume computation process 104. In character recognition process 102, character recognition is performed on an image contained in text region 201 of input image 200, so that text-region text data is generated. The text-region text data contains information on types of recognized characters, and settings information such as character size, line spacing, margin, and the like. In character recognition process 102, an image contained in graphics region 202 is also processed, to generate graphics-region text data. The graphics-region text data contains information on types, positions, and sizes of characters contained in graphics region 202.

In translation process 103, translation to another language is performed on the text-region text data and the graphics-region text data, to generate text-region translated text data 204 and the graphics-region translated text data 205 for allocation respectively to text region 201 and graphics region 202 of the data of translated text with graphics that has been stored in the work area. The text-region translated text data 204 contains information on types of characters forming translated text and settings information inherited from the original text-region text data; and the graphics-region translated text data 205 contains information showing types of characters forming translated text and information showing positions and sizes of characters inherited from the original graphics-region text data. The language of text contained in input image 200 and that of translated text are respectively specified by a command provided through operation unit 5 or communication interface 3, and translation is performed in translation process 103 in accordance with the command.

In FIG. 2, processes grouped by a dashed line form a layout configuration processor 500 for generating data of translated text with graphics, the data containing in its text region text-region translated text data 204 and containing in its graphics region graphics-region translated text data 205 and data of graphics region 202 of input image 200. In text volume computation process 104, a volume of data of translated text represented by text-region translated text data 204 is computed and stored in non-volatile memory 7. In a region size computation process 105, the size (i.e., the area) of text region 201 and graphics region 202 are computed and stored in volatile memory 6. Region size computation process 105 may be executed at any timing after the layout analysis process 101 and before text volume/region size comparison process 106.

In the text volume/region size comparison process 106, the volume of characters of translated text obtained by text volume computation process 104 is compared with the size of text region 201 obtained by the region size computation process 105, and a result of the comparison is stored in volatile memory 6. Specifically, in the text volume/ region size comparison process 106, the ratio is computed between an area occupied by an image obtained by imaging translated text represented by text-region translated text data 204 and a size of text region 201 in which the image is to be accommodated, and the computed ratio is stored in volatile memory 6.

CPU 8, based on a result obtained by executing text volume/ region size comparison process 106, executes a text size scaling process 107 or a graphics scaling process 108. Text size scaling process 107 controls, as a settings control means, settings of text-region translated text data 204 in the data of translated text with graphics so that a layout of input image 200 is inherited as a layout of text region 201 and graphics region 202 of the data of translated text with graphics. Specifically, in text size scaling process 107, the size of each character of translated text is computed based on the ratio between the occupied area of present translated text and the size of the text region, the ratio having been obtained in text volume/ region size comparison process 106, so that, when text-region translated text data 204 is imaged, the image can be accommodated in the text region 201.

Graphics scaling process 108 is performed when it is determined that an image of translated text can be accommodated in text region 201 without changing the size of characters if the size of graphics region 202 is reduced (or enlarged) so as to enlarge (or to reduce) the size of text region 201 within a maximum permissible limit. The determination is made based on the ratio obtained in the text volume/region size comparison process 106. In graphics scaling process 108, a size is obtained of text region 201 that will be needed for accommodating an image obtained by imaging text-region translated text data 204 without changing settings such as sizes of characters forming the data 204. Further, in a case that the size of text region 201 is changed according to the obtained size, a size is also obtained of graphics region 202, so that text region 201 and graphics region 202 that were in the same page of input image 200 can also be accommodated in the same page of data of translated text with graphics. Then, a scaling factor is obtained of graphics, the scaling factor being the ratio of sizes between before and after change.

In a reconfiguration process 109, data of translated text with graphics is reconfigured, the data being stored in a work area of volatile memory 6, using results obtained by executing text size scaling process 107 and graphics scaling process 108.

In a case that text size scaling process 107 is executed but graphics scaling process 108 is not, in reconfiguration process 109, an image of graphics region 202 of input image 200 excluding an image of text is first stored in graphics region 202 of the data of translated text with graphics in the work area. Next, graphics-region translated text data 205 obtained from the graphics region 202 of input image 200 is stored in the graphics region 202 of the data of translated text with graphics. When data stored in the graphics region 202 is reproduced as an image, translated text in the graphics region 202 will have the same size and occupy the same position as the original text of input image 200. Subsequently, text-region translated text data 204 obtained from the text region 201 of input image 200 is stored in the text region 201 of the data of translated text with graphics. Information specifying sizes of characters contained in text-region translated text data 204 shows sizes after text size scaling process 107 is applied. As a result, when text-region translated text data 204 is imaged, the image fits exactly to text region 201.

On the other hand, in reconfiguration process 109, in a case where text size scaling process 107 is not executed but graphics scaling process 108 is, text region 201 and graphics region 202 of the data of translated text data with graphics are changed according to results obtained by executing graphics scaling process 108. An image of graphics region 202 of input image 200 after excluding an image of characters is enlarged or reduced according to a scaling factor obtained through graphics scaling process 108, for storage into graphics region 202 of the data of translated text with graphics.

Further, information showing character sizes contained in graphics-region translated text data 205 is modified to show values obtained by multiplying the scaling factor obtained in graphic scaling process 108. Information showing positions of characters of graphics-region translated text data 205 is also modified according to the scaling factor. The modification is performed so that, when graphics-region translated text data 205 is imaged, an image of characters of translated text occupies the identical positions, in graphics region 202, relative to the original characters of the input image. Next, text-region translated text data 204 is stored in text region 201 of the data of translated text with graphics. The information specifying character sizes contained in text-region translated text data 204 has not undergone text size scaling process 107, but text region 201 is changed through graphics scaling process 108. As a result, when text-region translated text data 204 is imaged, the image of the translated text fits exactly to text region 201.

Thus, the data of translated text data with graphics is stored in a work area of volatile memory 6, after the text contained in the original input image is replaced with translated text. The data of translated text with graphics is then printed by printing device 2 on a recording paper, or is transmitted through communication interface 3 to an outside user who needs the results of translation.

FIGS. 4A to 4B are diagrams for describing the effects of the present invention in comparison with the conventional technique. In this example, an input image of a document with graphics in a foreign language, as shown in FIG. 4A, is stored in volatile memory 6, and a text portion of the input image is translated into Japanese.

When the conventional technique is used, in a case that translated text of character strings in a text region of an input image can no longer be accommodated in the original text region, a graphics region is shifted to a next page relative to the original page as shown in FIG. 4B and the translated text is positioned in a text region which has been enlarged as a result of shifting the graphics region to the next page. As a result, a layout of the text region and the graphics region in the translated text with graphics output using the conventional technique looks considerably different from the original document with graphics in a foreign language as an input image. The result is that the translated text is difficult to read.

Conversely, in the present embodiment, translated text with graphics as shown in FIG. 4C or FIG. 4D is obtained. FIG. 4C shows translated text with graphics obtained by executing text size scaling process 107 but not graphics scaling process 108; and FIG. 4D shows translated text with graphics obtained by executing not text size scaling process 107 but graphics scaling process 108. As shown in these figures, the translated text with graphics obtained according to the present embodiment would be either one (FIG. 4C) whose layout of a text region and a graphics region is the same as, or one (FIG. 4D) which is not considerably different from the input image. As a result, the translated text with graphics obtained according to the present embodiment is easy for a user to understand when compared with the translated text with graphics output using the conventional technique.

Second Embodiment

The first embodiment is effective also for a case where an input image having plural pages is to be processed. In a case that an input image having plural pages is to be processed, according to the first embodiment, data of translated text with graphics is generated while maintaining a text region, a graphics region, and margins of each page as much as possible, and text-region translated text data obtained from a text region of each page of the input image is stored in a text region of the same page of the data of translated text with graphics as that of the input image. However, when this rule is strictly applied, it might give rise to a disparity between different pages in the density of translated text in a text region of each page of the data of translated text with graphics. In the present embodiment, text-region translated text data can be transferred between different pages within a maximum permissible limit to reduce the disparity in the density of translated text. In other words, for example, in a case where a text volume of translated text is large relative to a size of a text region of a certain page, but in the next page a text volume of translated text is small relative to the size of its text region, character strings in the last portion, which are unlikely to fit to the former page, can be transferred to the latter page. Conversely, in a case where a text volume of translated text is small relative to a size of a text region of a certain page, but in the next page a text volume of translated text is large relative to the size of its text region, character strings in the forward end portion of the latter page can be transferred to the former page.

The disparity between different pages in the density of translated text is thus reduced; however, this gives rise to another problem. That is, in a case where character strings transferred to another page contain reference numbers of graphics contained in a page where the transferred character strings were previously positioned, a user must take the trouble to turn to the previous page to confirm the graphics which are referred to in the text containing the reference numbers. The present embodiment also prevents such an inconvenience to a user.

Figure 5:
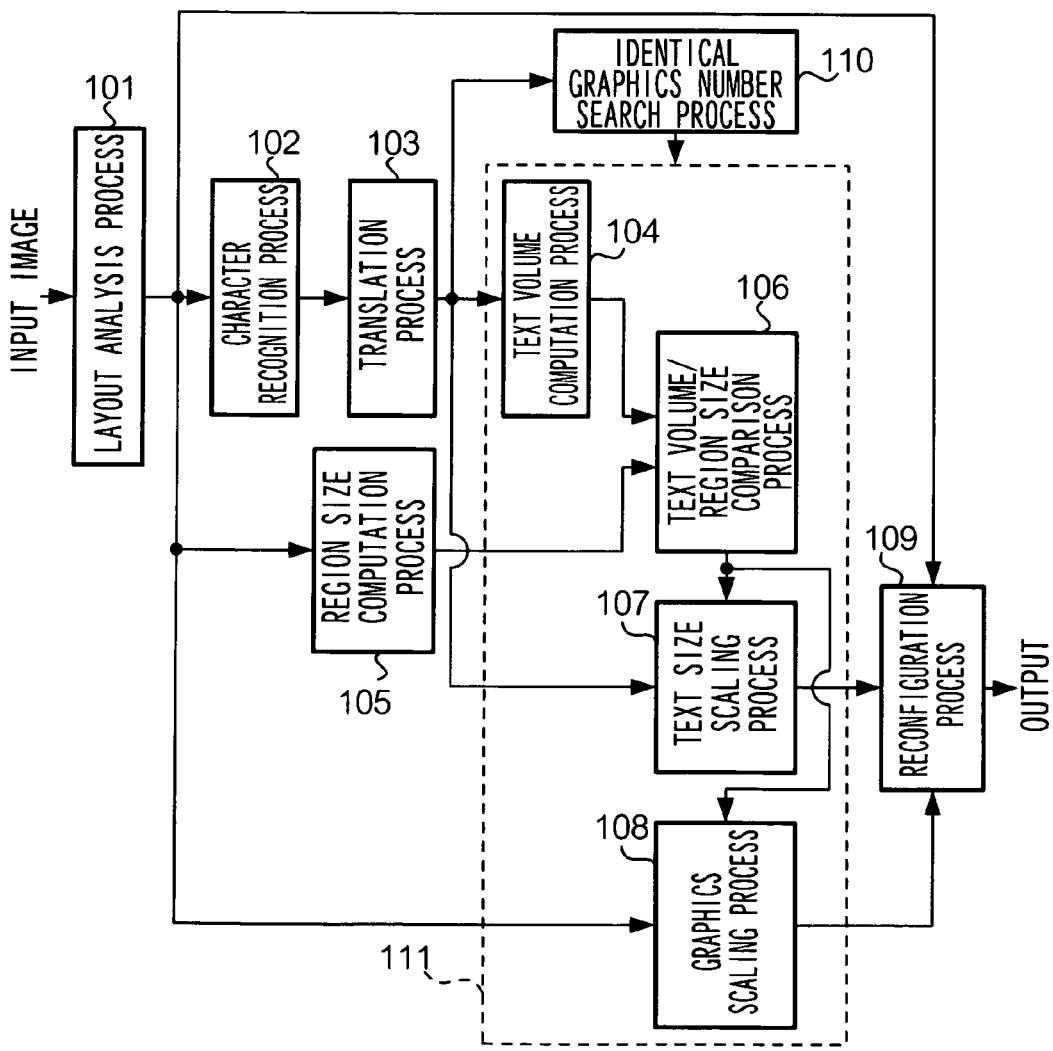
FIG. 5 is a flowchart showing a procedure of a document-with-graphics translation program according to a second embodiment of the present invention.

FIG. 5 is a flowchart showing a procedure of a document-with-graphics translation program executed according to the present embodiment. In the figure, the same reference numbers are used for those processes corresponding to the processes shown in FIG. 2. In the document-with-graphics translation program according to the present embodiment, an identical graphics reference number search process 110 is also provided, and, based on a result obtained by executing identical graphics reference number search process 110, it is determined whether to execute text volume computation process 104, text volume/region size comparison process 106, text size scaling process 107, and graphics scaling process 108 that are bracketed together by a dashed line (hereinafter referred to as grouped processes 111, for convenience). In other words, identical graphics reference numbers search process 110 includes a translated text data transfer control means for transferring text-region translated text data between text regions of different pages in the data of translated text with graphics within a maximum permissible limit, and a transfer control/settings control switching means for causing settings control means to control settings of a page in question, instead of transferring translated text data by the translated text data transfer control means, in a case a) where graphics identification information identifying graphics is contained in graphics-region translated text data, b) where the same graphics identification information as that which is contained in the graphics-region translated text data is contained in text-region translated text data of the same page as that before the transfer of translated text data is performed by the translated text data transfer control means, and c) where the graphics identification information is to be transferred to a different page when translated text data is to be transferred by the translation text data transfer control means. In the following, the details thereof are described.

Identical graphics number search process 110 is executed when the transfer of character strings of translated text between different pages is likely to be performed. Specifically, identical graphics reference number search process 110 is performed on each page from which certain character strings may overflow to another page, and it is determined whether such an outflow should be permitted.

Such an outflow of a character string to another page may be permitted in a case where the character string which is to outflow from a text region of a certain page does not contain any graphics identification information such as its reference numbers and titles, or where, even if such graphics identification information is contained, it does not correspond to graphics identification information in the graphics region of the same page. Conversely, the outflow of a character string to another page should not be permitted in a case where the character string which is to outflow from a text region of a certain page does contain graphics identification information and it corresponds to graphics identification information in the graphics region of the same page.

In identical graphics reference number search process 110, the above determination is performed for each page from which or to which character strings of translated text are transferred between different pages, so as to determine whether the transfer of characters is permitted. The transfer of characters is executed only for a permitted page, and translated text to be allocated to a text region of each of the pages is determined. As a consequence, text regions of some pages might be filled to overflowing because the outflow of character strings to another page is not permitted, or text regions of some pages might contain blank space because the inflow of character strings from another page is not permitted. In identical graphics reference number search process 110, it is determined that grouped processes 111 should be executed for some such pages and that grouped processes 111 need not be executed for the other pages.

Grouped processes 111 are executed only when it is determined by the above-described identical graphics reference number search process 110 that grouped processes 111 need be executed. The details of grouped processes 111 and the reconfiguration process are described in the first embodiment, and therefore, duplicate description will be omitted.

According to the present embodiment, text size scaling process 107 and graphics scaling process 108 are performed only when reference number(s) of graphics in a text region is likely to be transferred to another page as a result of translation when it is preferable to have the reference number(s) in the same page as that containing the graphics to which the reference number(s) refers, to prevent the transfer of a reference number to another page where the graphics to which the reference number(s) refers is not positioned. Thus, the translated text with graphics obtained according to the present invention will be easy to read for a user since the user need not refer to a different page when referring to graphics while reading main text, and also since the size of characters and/or graphics is not changed more than necessary.

Other Embodiments

In the foregoing, the first and second embodiments have been described, but the following embodiments are also possible for the present invention.

1) In the first and second embodiments, line spacing may be changed so that translated text fits to a text region instead of executing text size scaling process 107.
2) In the first and second embodiments, the size of a text region may be adjusted by enlarging or reducing the size of margins so that translated text can be accommodated therein.
3) Both graphics scaling process 108 and text size scaling process 107 may be executed to reconfigure a layout. Some modes are envisioned in this case. In a first mode, the upper and lower limits may be provided to a scaling factor of a character size, and text size scaling process 107 is executed in the provided limits. In a case where an image of translated text in a text region cannot be accommodated in the same page as the original page even if a character size is reduced or enlarged according to a scaling factor within the limit, graphics scaling process 108 is further executed so that an area needed for accommodating an image of text-region translated text data is reserved by reducing or enlarging a graphics region. In a second mode, upper and lower limits are provided to a scaling factor of a graphics region, and graphics scaling process 108 is executed within the provided limits. In a case where an image of text-region translated text data cannot be accommodated in the same page as the original page even if the graphics region is reduced or enlarged according to a scaling factor within the limit, text size scaling process 107 is executed so that an image of text-region translated text data can be accommodated in a text region.

4) In some cases, so-called "N-Up" printing might be specified by a user, wherein the "N-Up" is to output an image of N-number pages as a combined image in one page. In such a case, identical graphics reference number search process 110 may perform a determination such as the following. Description will be given hereinafter of an example of the "2-Up" printing.

As shown in FIG. 6, a case is assumed of generating data of translated text with graphics 400-1 which is a 2-Up mode of data of input images 200-1 and 200-2 being output on the same paper surface. In an example shown in FIG. 6, input image 200-1 contains in its text region 201 graphics identification information corresponding to that contained in its graphics region 202. In data of translated text with graphics 400-1, in some cases, due to the change in a number of characters as a result of the translation, a translation of graphics identification information ""☒1" to be contained in text region 201 of a page corresponding to input image 200-1 may not be accommodated in the same text region 201. In such a case, since the graphics identified by graphics identification information ""☒1" exist on the same paper surface, the transfer of a translation ""☒1" to text region 201 of a page corresponding to input image 200-2 from that of a page corresponding to input image 200-1 is permitted in identical graphics reference number search process 110. It is further determined in identical graphics reference number search process 110 that the execution of grouped processes 111 is not needed for a page originally accommodating the translation " "☒1".

As shown in FIG. 7, a case is assumed of generating data of translated text 400-1 which causes an output of data corresponding to input images 200-1 and 200-2 on the same paper surface in a 2-Up mode and data of translated text 400-2 which causes an output of data corresponding to input images 200-3 and 2004 on the same paper surface in a 2-Up mode. In the example shown in FIG. 7, for input images 200-1 and 200-2, graphics identification information which corresponds to graphics identification information existing in a graphics region 202 of input image 200-1 exists in a text region 201 of input image 200-2. In data of translated text with graphics 400-1, in some cases, due to the change in a number of characters through the translation process, a translation " "☒1" of graphics identification information to be accommodated in a text region 201 of a page corresponding to input image 200-2 cannot be accommodated in the text region 201 if in the same character size. If the transfer of the translation ""☒1" of graphics identification information to a next page (i.e., a page corresponding to input image 200-3) is permitted, the graphics identified by graphics identification information ""☒1" will not be in the same page as that in which the graphics identification information exists. To avoid such a result, in identical graphics reference number search process 110, the transfer of character strings is not permitted, and it is determined that grouped processes 111 should be executed on data corresponding to input image 200-2. The same effects as the above second embodiment can be attained according to the present embodiment.

5) In each of the above embodiments, translated text data is stored as text data in a text region and in a graphics region of data of translated text with graphics, so that the data of translated text with graphics is generated, having both text data and image data. Alternatively, data of translated text may be imaged to map the imaged translated text onto a text region and a graphics region, so as to generate data of translated text with graphics consisting entirely of image data.

6) In each of the above embodiments, the document-with-graphics translation program is installed in a multi-functional machine. However, the embodiments of the present invention are not restricted to such a mode, but the document-with-graphics translation program of the above embodiment may be stored in a computer-readable recording medium such as a CD-ROM, for distribution to general users. Alternatively, the document-with-graphics translation program may be distributed to general users through a network.

Third Embodiment

In the following, description will be given of a third embodiment of the present invention with reference to the drawings.

FIG. 8 is a block diagram showing an image forming device 100 according to an embodiment of the present invention. As shown in the figure, image forming device 100 has a translation processing unit 1, an operation unit 2, a network I/F unit 3, a memory storage unit 4, a printing unit 5, and an image reading unit 6.

Printing unit 5 has a photoreceptor, an exposure unit, a transferring unit, and a fixing unit. Printing unit 5 generates toner images based on an image data supplied from translation processing unit 1 to fix the toner images on a paper sheet, which is a recording medium. Operation unit 2 has a display unit made of a liquid crystal display (not shown) and various buttons, thereby to receive instructions from a user. A user, using operation unit 2, selects paper to use, inputs various settings for printing, and so on.

Image reading unit 6 scans data of a source document, and outputs as image data. Memory storage unit 4 stores image data scanned by image reading unit 6 as well as other data. Data communication is enabled through network I/F unit 3 between translation processing unit 1, operation unit 2, memory storage unit 4, printing unit 5, and image reading unit 6.

Translation processing unit 1, as shown in FIG. 9, includes a CPU (Central Processing Unit) 11, a RAM (Random Access Memory) 12, and a ROM (Read Only Memory) 13. Translation processing unit 1 controls each unit of image forming device 100, and executes computations needed for various image processes and translation processes of input image data. Image data is temporarily stored in RAM 12, to be processed. There are stored in ROM 13 various image processing programs PRG and translation programs PRG required for image data processing and translation processing.

Figure 10:
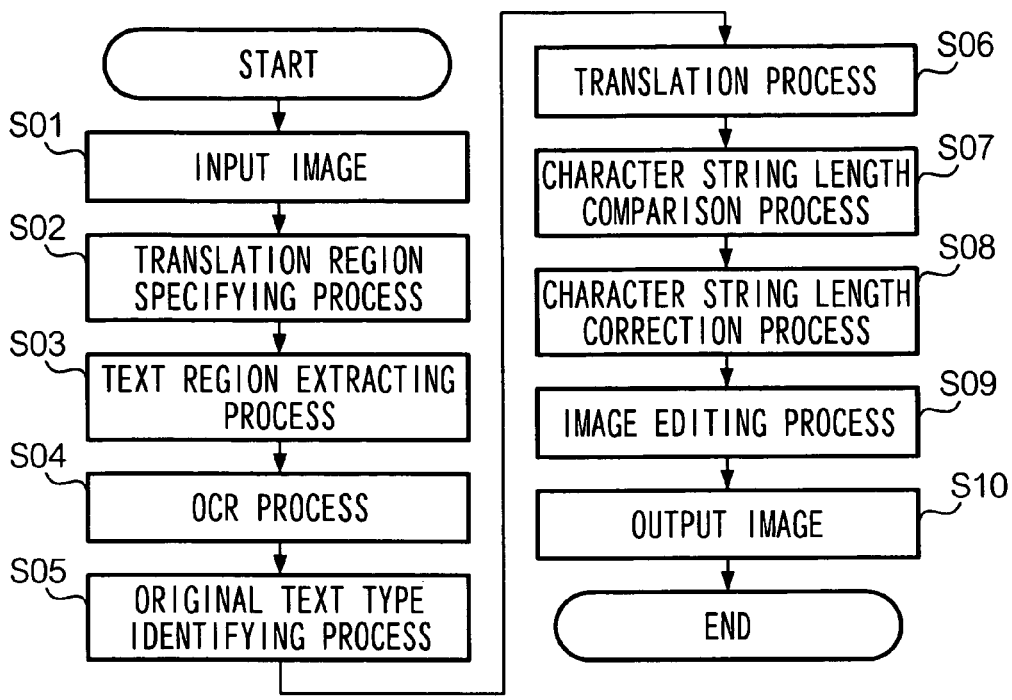
FIG. 10 is a flowchart showing a process performed by a translation processing unit.

Description will next be given of an example of an operation performed by image forming device 100 with the above configuration, according to a flowchart shown in FIG. 10. In this example, an image of a source document is read by image forming device 100, and Japanese text contained in the image is translated into English.

A source document is placed on a scanning plate (not shown) of image reading unit 6, which is then caused to start reading the document. As a result, image reading unit 6 reads an image existing in a scanned area (Step S01).

Figure 11A:
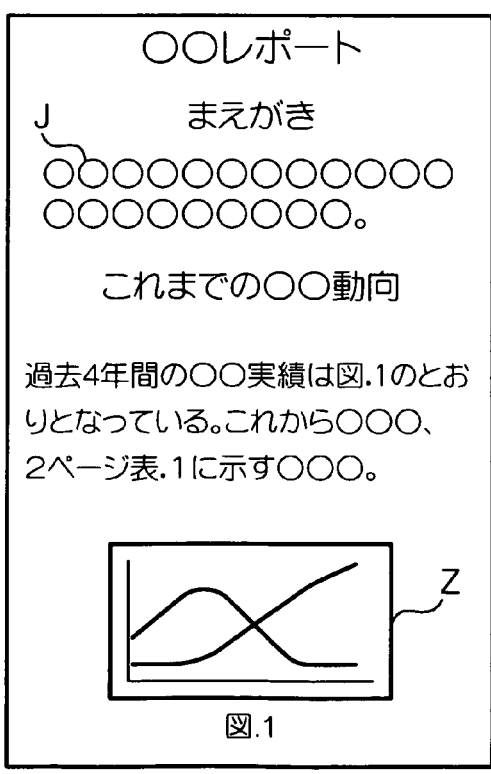
FIGS. 11A and 11B are diagrams showing an image for describing a process performed in the translation processing unit.

FIG. 11A shows an example of an image read by image reading unit 6. As shown, scanned image G is an image including original text J (including portions indicated by circles in the figure) comprising Japanese text and graphics Z.

A user, while referring to a display screen of operation unit 2 which shows an image such as that shown in FIG. 11A, operates an input instrument such as a mouse or a keyboard to move a pointer or a cursor, so as to specify a region for translation in the scanned image G (Step S02). In this example, a full region of image G (all of image G shown in FIG. 11A) is specified as a translation region.

When a user specifies the full region as a translation region, translation processing unit 1 identifies text of image data in the full region which is specified in image G. The identified text is extracted from the full image data (Step S03).

Translation processing unit 1 then performs an OCR (Optical Character Reader) processing on image data of a region containing the extracted text, converts image data of text in the region into text data, and reads the converted text data as text data for original text J (Step S04).

CPU 11 of translation processing unit 1 subsequently obtains language information stored in ROM 13 and compares language information with the text data of original text J to identify a language of the original text J (Step S05). In this example, CPU 11 identifies the language of the original text J as being Japanese after comparing the text with the language information in ROM 13.

Further, CPU 11 of translation processing unit 1 runs and executes a Japanese-to-English translation program from among translation processing programs PGM stored in ROM 13, thereby to generate text data of a translated text E in English (Step S06).

After generating translated text E based on original text J, translation processing unit 1 compares the length of a character string of translated data E and that of original text J (Step S07).

In this embodiment, a transversal length of an image of a semantic section, for example, a clause or a sentence, of the original text J is determined as a length of a character string; and a length obtained by totaling a number of dots of each character in its transversal direction and a number of dots of spaces between characters in the transversal direction of translated text E is determined as a length of a character string. The determined character string length of translated text E is compared with that for original text J. Alternatively, a character string length for original text J may be determined as being a total of a number of dots of characters in a transversal direction for a semantic section.

Translation processing unit 1, based on a result of the comparison between a character string length of original text J and that of translated text E, determines an appropriate process, from among correction processes such as changing a font and/or points, equal spacing, etc., as a correction process to be applied to translated text E. Translation processing unit 1 then performs the determined correction process to change a character string length of translated text E to a length identical to that of original text J (Step S08).

It is to be noted that translation processing unit 1 determines the character string length of translated text E and that of original text J as being identical to each other when the character string length of translated text E fits within a predetermined range of a number of dots that is visually recognized by a user as being identical.

FIG. 12A shows a character string of Japanese original text J and that of translated text E. As shown, a character string of translated text E is longer than that of original text J. In this case, translation processing unit 1, based on a result of the comparison of a character string length between original text J and translated text E, changes a font and reduces a number of points of the character size as a correction process. Translation processing unit 1 changes the font and points of the character size, thereby to reduce a character string length, so that a character string length of translated text E is changed to become identical to that of original text J within a predetermined range of a number of dots as shown in FIG. 12B.

Next, translation processing unit 1 adds to an image data of entire image G, text data of translated text E which has undergone the correction process, so that translated text E whose length of character strings has been corrected is positioned in parallel to and below original text J (Step S09)

When an instruction for printing is input by a user via operation unit 2, image data processed in translation processing unit 1 is output to printing unit 5, and in printing unit 5, an image representing the image data is printed on a paper (Step S10).

Figure 11B:

As a result, as shown in FIG. 11B, translated text E in English (shown by X marks in the figure) whose length of character strings is fitted, is positioned below original text J in Japanese existing in an entire portion of a defined range.

Thus, according to the embodiment, by changing points and font of characters of translated text E, translated text E can be positioned in parallel to original text J, with the length of character string being made identical to that of original text J. As a result, it becomes possible to readily identify correspondences between original text J and translated text E from a printed object representing an image data of translated text E and original text J being positioned in such a manner; thus, viewability of the printed object is greatly enhanced.

Further, since data of text in an image data is extracted before translation, it becomes possible to ensure translation only of characters or text of an image containing graphics.

In the above embodiment, description is given of a case where a character string of translated text becomes longer than that of an original text. In a case where a character string of translated text becomes shorter than that of an original text, the translation processing 1 performs the same process as the above by equally spacing translated text in relation to an original text, so that the length of the translated text is made identical to the original text, and the translated text and the original text are positioned in parallel to each other.

Further, in the above embodiment, since a length of a character string is corrected by changing points or a font of characters in translated text, characters of the translated text may be changed alternatively to ruby-type characters to correct the length of a character string of translated text.

In the above embodiment, description is given of an example of a process of fitting the length of a character string in relation to original text. Obviously, the length of a character string of an original text or of an original text and translated text may be changed to have equal length in relation to each other. In a case of modifying the length of a character string of an original text, a font or points of characters may be changed after converting the original text into characters, or the converted characters may be equally spaced in relation to a translated text. Alternatively, an image data of an original text may be enlarged or reduced in its size to make adjustment.

The length of a character string may be determined, not only by totaling a number of dots, but instead by using a number of characters, so long as a number of dots in a transversal direction of characters and spaces between the characters are predefined. Alternatively, the length of a character string may be determined according to a length (mm) of a printout.

Obviously, languages of an original text and a translated text are not limited to those described in the above embodiment, and may be German, French, Russian, Spanish, Chinese, Korean, and others.

In the above embodiment, the description is given assuming that the present invention is implemented in image forming device 100, but it is not limited thereto. It is also possible, for example, to provide a translation device or an image processing device which only has functions of translation processing unit 1 of the above image forming device 100. In this case, a translation device or an image processing device may be an ASIC (Application Specific Integrated Circuit) having the functions of the above translation processing unit 1. Further, the present invention may be provided by recording the above translation processing program PRG for performing the translation process onto a recording medium such as a magnetic disk, a floppy disk, a CD (Compact Disk), a DVD (Digital Versatile Disk), and a RAM and the like.

As described above, the present invention provides a translation device, comprising: a character recognition unit that recognizes text data in a text region of an input image; a translator that translates the text data in the text region; and a layout configuration processor that generates data containing the translated text data in the text region and graphics in the input image, wherein a layout of the input image is maintained in a layout of the image of the data generated by the layout configuration processor.

According to an embodiment of the present invention, the layout configuration processor may change a setting of the translated text data based on a volume of the translated text data and size of the text region.

According to another embodiment, the layout configuration processor may generate the translated text data by changing size of characters of the translated text data.

According to another embodiment, the layout configuration processor may generate the translated text data by changing line spacing of the translated text data.

According to another embodiment, the layout configuration processor may generate the translated text data by changing margins surrounding the translated text data.

According to another embodiment, the layout configuration processor may generate the data by changing size of the graphics region.

According to still another embodiment of the present invention, the translation device may further comprise a graphics re-forming unit that re-forms the graphics region in a case that, by re-forming the text region within a predetermined area, the translated text data can be accommodated in the re-formed text region in same size of characters of the text data.

According to another embodiment, the translation device further comprises a graphics re-forming unit that re-forms the text region and the graphics region in a case that, by changing the settings of the translated text data within a predetermined manner, the translated text data can not be accommodated in the text region.

According to another embodiment, the character recognition unit may further execute a character recognition process of an image of the graphics region in the input image, to output graphics-region text data showing types, positions, and sizes of characters in the graphics region; the translation processor may further execute a translation process of graphics-region text data, to output graphics-region translated text data showing types, positions, and sizes of characters to be accommodated in the graphics region; and the layout configuration processor may comprise: a translated data transfer controller that transfers the text-region translated text data within a predetermined manner between text regions of different pages of the data of translated text with graphics; and a switching unit that performs the control of the settings for a page instead of performing the transfer of graphics identification information identifying graphics, in a case where the graphics identification information is contained in the graphics-region translated text data of the page, where graphics identification information that is identical to the contained graphics identification information is contained in text-region translated text data of the same page in which it was contained before the transfer of the translated text data is performed by translated data transfer controller, and where the graphics identification information is to be transferred to a text region of another page when the transfer of translated text data is performed by the translated data transfer controller.

According to another embodiment, the character recognition unit may further execute a character recognition process of an image of the graphics region in the input image, to output graphics-region text data showing types, positions, and sizes of characters in the graphics region; the translation processor may further execute a translation process of graphics-region text data, to output graphics-region translated text data showing types, positions, and sizes of characters to be accommodated in the graphics region; and wherein the layout configuration processor may comprise: a translated data transfer controller that transfers the text-region translated text data in a predetermined manner between text regions of different pages of the data of translated text with graphics; and a switching unit that performs the control of the settings for a page instead of performing the transfer of graphics identification information identifying graphics, when generating the data of translated text with graphics having an N-up configuration with a plurality of pages being placed on the same paper surface, in a case where the graphics identification information is contained in the graphics-region translated text data placed in a paper surface, where graphics identification information that is identical to the contained graphics identification information is contained in text-region translated text data of the same paper surface as that before the transfer of the translated text data was performed by translated data transfer controller, and where the graphics identification information is to be transferred to a text region of another paper surface when the transfer of translated text data is performed by the translated data transfer controller.

As described above, the present invention further provides a translation device comprise a translation processor that translates an original text and performs corrections for causing a length of a character string of the original text and a character string of the translated text to be substantially identical to each other, wherein the original text and the translated text are located in parallel.

According to an embodiment of the present invention the translation processor may change the character length of at least one of the original text and the translated text.

According to another embodiment, the translation processor may determine a length of a character string by totaling a number of dots of characters and spaces in between the characters.

According to anther embodiment, the translation processor may change a point size of characters.

According to another embodiment, the translation processor may change fonts of characters.

According to another embodiment, the translation processor may change characters to ruby-type characters.

In one aspect, the present invention provides a translation method comprising: recognizing text data in a text region of an input image; translating the text data in the text region; and generating data containing the translated text data in the text region and graphics in the input image, wherein a layout of the input image is maintained in a layout of the image of the data generated in the generating step.

In another aspect, the present invention further provides the translation method comprising: translating an original text and performing corrections for causing a length of a character string of the original text and a character string of the translated text to be substantially identical to each other, wherein the original text and the translated text are located in parallel.

In still another aspect, the present invention further provides a computer readable storage medium, the storage medium storing a program of instruction executable by the computer to perform functions for translation, the functions comprising: a character recognition function for recognizing text data in a text region of an input image; a translation processing function for translating the text data in the text region; and a layout configuration processing function for generating data containing the translated text data in the text region and graphics in the input image, wherein a layout of the input image is maintained in a layout of the image of the data generated by the layout configuration processing function.

Further, the present invention provides a computer readable storage medium, the storage medium storing a program of instruction executable by the computer to perform a function for translation, the function comprising: a translation processing function for translating an original text and performing corrections for causing a length of a character string of the original text and a character string of the translated text to be substantially identical to each other, wherein the original text and the translated text are located in parallel.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments, and with the various modifications as are suited to the particular use contemplated. It is intended that the scope of the invention be defined by the following claims and their equivalents.

The entire disclosure of Japanese Patent Application No. 2005-82047 filed on Mar. 22, 2005 and No. 2005-90179 filed on Mar. 25, 2005 including specification, claims, drawings and abstract is incorporated herein by reference in its entirety.

What is claimed is:

1. A translation device, comprising:
   a character recognition unit that recognizes text data in a text region of an input image;
   a translation processor that translates the text data in the text region; and
   a layout configuration processor that generates data containing the translated text data in the text region and graphics in the input image,
   wherein a layout of the input image is maintained in a layout of the image of the data generated by the layout configuration processor, by changing at least one of a size of the text region and graphics if a total area of the text region for the translated text data and the graphics exceeds an area of the text region of an original text and the graphics, wherein
   the character recognition unit further executes a character recognition process of an image of the graphics region in the input image, to output graphics-region text data showing types, positions, and sizes of characters in the graphics region;
   the translation processor further executes a translation process of graphics-region text data, to output graphics-region translated text data showing types, positions, and sizes of characters to be accommodated in the graphics region; and
   the layout configuration processor comprises:
      a translated data transfer controller that transfers a portion of the text-region translated text data of a current page to text regions of another page based on a determination that the total area for the translated text data on the current page is greater than a predetermined degree; and
      a switching unit that performs the control of the settings for a page and that:
         permits transfer of the portion of the text region translated text data when the portion does not contain any graphics identification information that corresponds to graphics identification information in the graphics region of the same page, and
         does not permit the transfer of the portion of the text region translated text data when the portion does contain graphics identification information that corresponds to graphics identification information in the graphics region of the same page.

2. A translation device comprising:
   a translation processor that:
      translates an original text, and
      performs corrections for changing a length of a character string of the translated text to be substantially identical to a length of a character string of the original text, wherein
      the original text and the translated text are adjacent to and located in parallel with each other in an interlace manner,
      the length of the character string of the translated text is determined to be substantially identical to the length of the character string of the original text when the character string length of the translated text fits within a predetermined range of a number of dots,
      the translation processor determines the length of the character string by totaling the number of dots of characters and spaces in between the characters, and
   a layout configuration processor that includes:
      a translated data transfer controller that transfers a portion of the translated text of a current page to text regions of another page based on a determination that a total area for the translated text on the current page is greater than a predetermined degree; and
      a switching unit that performs a control of settings for a page and that:
         permits transfer of the portion of the translated text when the portion does not contain any graphics identification information that corresponds to graphics identification information in a graphics region of the same page, and
         does not permit transfer of the portion of the translated text when the portion does contain graphics identification information that corresponds to the graphics identification information in the graphics region of the same page.

3. A translation device according to claim 2, wherein the translation processor changes the character length of at least one of the original text and the translated text.

4. A translation device according to claim 2, wherein the translation processor changes a point size of characters.

5. A translation device according to claim 2, wherein the translation processor changes fonts of characters.

6. A translation device according to claim 2, wherein the translation processor changes characters to ruby-type characters.

7. A translation method comprising:
translating, by a translation processor, an original text,
performing corrections for changing a length of a character string of the translated text to be substantially identical to a length of a character string of the original text, wherein
the original text and the translated text are adjacent to and located in parallel with each other in an interlace manner,
the length of the character string of the translated text is determined to be substantially identical to the length of the character string of the original text when the character string length of the translated text fits within a predetermined range of a number of dots,
the length of the character string is determined by totaling the number of dots of characters and spaces in between the characters,
transferring, by a translated data transfer controller, a portion of translated text of a current page to text regions of another page based on a determination that a total area for the translated text on the current page is greater than a predetermined degree,
permitting transfer, by a switching unit, the portion of the translated text when the portion does not contain any graphics identification information that corresponds to graphics identification information in a graphics region of the same page, and
not permitting transfer, by the switching unit, the portion of the translated text when the portion does contain the graphics identification information that corresponds to the graphics identification information in the graphics region of the same page.

8. A non-transitory computer readable storage medium, the storage medium storing a program of instruction executable by the computer to perform a function for translation, the function comprising:
a translation processing function for:
translating an original text, and
performing corrections for changing a length of a character string of the translated text to be substantially identical to a length of a character string of the original text, wherein
the original text and the translated text are adjacent to and located in parallel with each other in an interlace manner,
the length of the character string of the translated text is determined to be substantially identical to the length of the character string of the original text when the character string length of the translated text fits within a predetermined range of a number of dots,
the length of the character string is determined by totaling the number of dots of characters and spaces in between the characters,
a layout configuration processor that includes:
a translated data transfer controller that transfers a portion of the translated text of a current page to text regions of another page based on a determination that a total area for the translated text on a current page is greater than a predetermined degree; and
a switching unit that performs a control of settings for a page and that:
permits transfer of the portion of the translated text when the portion does not contain any graphics identification information that corresponds to graphics identification information in a graphics region of the same page, and
does not permit transfer of the portion of the translated text when the portion does contain graphics identification information that corresponds to the graphics identification information in the graphics region of the same page.

9. A translation method comprising:
recognizing, by a character recognition unit, text data in a text region of an input image;
translating, by a translation processor, the text data in the text region; and
generating, by a layout configuration processor, data containing the translated text data in the text region and graphics in the input image,
changing at least one of a size of the text region and graphics if a total area of the text region for the translated text data and the graphics exceeds an area of the text region of an original text and the graphics so as to maintain a layout of the input image in a layout of the image of the data generated in the generating step;
executing, by the character recognition unit, a character recognition process of an image of the graphics region in the input image, to output graphics-region text data showing types, positions, and sizes of characters in the graphics region; and
executing, by the translation processor, a translation process of graphics-region text data, to output graphics-region translated text data showing types, positions, and sizes of characters to be accommodated in the graphics region,
wherein the layout configuration processor includes:
a translated data transfer controller that transfers a portion of the text-region translated text data of a current page to text regions of another page based on a determination that the total area for the translated text data on the current page is greater than a predetermined degree; and
a switching unit that performs the control of the settings for a page and that permits transfer of the portion of the text region translated text data when the portion does not contain any graphics identification information that corresponds to graphics identification information in the graphics region of the same page, and does not permit the transfer of the portion of the text region translated text data when the portion does contain graphics identification information that corresponds to graphics identification information in the graphics region of the same page.

10. A non-transitory computer readable storage medium, the storage medium storing a program of instruction executable by a computer to perform the method according to claim 9.

* * * * *